United States Patent
Sugaya

(10) Patent No.: US 8,558,480 B2
(45) Date of Patent: Oct. 15, 2013

(54) DRIVING METHOD OF LIGHT SOURCE APPARATUS FOR PROJECTOR

(75) Inventor: Katsumi Sugaya, Hyogo (JP)

(73) Assignee: Ushio Denki Kabushiki Kaisha, Tokyo (JP)

(*) Notice: Subject to any disclaimer, the term of this patent is extended or adjusted under 35 U.S.C. 154(b) by 411 days.

(21) Appl. No.: 12/399,404

(22) Filed: Mar. 6, 2009

(65) Prior Publication Data

US 2009/0224697 A1 Sep. 10, 2009

(30) Foreign Application Priority Data

Mar. 6, 2008 (JP) .............................. 2008-056084

(51) Int. Cl.
*H05B 37/02* (2006.01)

(52) U.S. Cl.
USPC .......................... 315/297; 352/198; 315/307

(58) Field of Classification Search
USPC ........... 315/108, 111.91, 146, 147, 148, 246, 315/252, 287, 307, 308, 326, 349, 360; 352/57, 134, 198, 199, 203; 353/85, 353/84, 31; 349/5, 7, 8; 348/742, 743, 771
See application file for complete search history.

(56) References Cited

U.S. PATENT DOCUMENTS

| | | | | |
|---|---|---|---|---|
| D258,692 S * | 3/1981 | Ozeki | ............................ | D26/28 |
| 6,046,782 A * | 4/2000 | Hayakawa | .................... | 348/742 |
| 6,737,807 B2 | 5/2004 | Nishida | | |
| 6,972,736 B1 * | 12/2005 | Wada et al. | ..................... | 345/32 |
| 7,138,769 B2 * | 11/2006 | Suzuki et al. | ................. | 315/289 |
| 7,604,356 B2 * | 10/2009 | Kubo | .............................. | 353/84 |
| 2005/0151937 A1 * | 7/2005 | Sugitani | .......................... | 353/85 |
| 2006/0022613 A1 | 2/2006 | Suzuki et al. | | |
| 2008/0174744 A1 * | 7/2008 | Myoung | ......................... | 353/84 |

FOREIGN PATENT DOCUMENTS

| | | |
|---|---|---|
| JP | 2003-051282 A | 2/2003 |
| JP | 2005-196011 A | 7/2005 |
| JP | 2006-185665 A | 7/2006 |
| JP | 2006-332015 A | 12/2006 |

OTHER PUBLICATIONS

Office Action issued in corresponding Japanese application No. 2008-056084, dated Jun. 5, 2012.

* cited by examiner

*Primary Examiner* — Douglas W Owens
*Assistant Examiner* — Jianzi Chen
(74) *Attorney, Agent, or Firm* — Rader, Fishman & Grauer PLLC

(57) ABSTRACT

A driving method for a light source apparatus for a projector using a single plate, comprises a step of supplying lamp current at a predetermined frequency to an extra-high pressure mercury lamp, a step of reversing a polarity of the lamp current to be supplied to the extra-high pressure mercury lamp, when one of boundaries between color areas of the color wheel is located at a light condensing area, and a step of supplying a low frequency current to the extra-high pressure mercury lamp at predetermined intervals, wherein the low frequency current starts to be supplied when a boundary from which a color area is changed to a predetermined color area is located at the light condensing area, and wherein the low frequency current continues to be supplied for a duration corresponding to the integer number of color areas of the color wheel.

21 Claims, 9 Drawing Sheets

DRIVING METHOD OF LIGHT SOURCE APPARATUS FOR PROJECTOR

CROSS-REFERENCES TO RELATED APPLICATION

This application claims priority from Japanese Patent Application Serial No. 2008-056084 filed Mar. 6, 2008, the content of which is incorporated herein by reference in its entirety.

TECHNICAL FIELD

The present invention relates to a drive method of a light source apparatus used for a single plate type projector apparatus in which a color wheel is used. Specifically the present invention relates to a drive method of a light source apparatus which is synchronized with a color wheel, thereby controlling electric supply.

BACKGROUND

A projector apparatus using liquid crystal or a DMD (Digital Micromirror Device) condenses light emitted from a light source (discharge lamp), by using a reflection mirror and a lens system, and irradiates a small device which displays image information, therewith, whereby light reflected or transmitted from the small device is irradiated to a screen through an optical system such as a lens etc. The discharge lamp is required so as to be a point light source. When the small device is as small as 1 inch or less and the angle component of incident light flux is smaller, the use efficiency of light becomes high and the contrast of an image also becomes good.

There are a single plate type and a three-plate type system as a method for projecting color image information. Recently, the single plate system has been mainly adopted due to miniaturization of a projector apparatus. The single plate system is also called a color sequential system. The DMD is irradiated with incandescent light emitted from the light source through a color wheel, which is divided RGB (red, green, blue) areas, and selected light is reflected by the DMD so as to irradiate a screen with the light. The DMD has the structure in which millions of small mirrors are laid for every pixel, and projection of light is controlled by controlling the direction of each small mirror. A configuration example of such a light source apparatus of the projector apparatus is disclosed in Japanese Laid Open Patent No. 2005-196011.

Where an alternating current extra-high pressure mercury lamp is used for a color sequential type projector, polarity reversal of lamp current is in general synchronized with and spoke time of the color wheel (switching timing between color areas) thereby operating the projector. This is because, if the synchronization is not taken, an optical output changes at the time of the polarity reversal of the lamp current, so that flickering occurs on a projection screen.

Japanese Laid Open Patent 2003-51282 discloses that, in an alternating current extra-high pressure mercury lamp, a projection is formed at the tip of an electrode, in order to control unstable electric discharge. Japanese Utility Model Publication No. 2006-332015 discloses that specially, an extra-high pressure mercury lamp in which mercury whose amount is 0.20 mg/mm$^3$ or more is enclosed, is operated at a lighting frequency in which a comparatively high frequency and a low frequency are combined with each other, since it is necessary to maintain and stabilize the projection of the electrode so as to have the appropriate shape, in order to stabilize an arc luminescent spot and to control the flicker phenomenon.

SUMMARY

When an alternating current extra-high pressure mercury lamp, is used as a light source of a single plate type projector, as described above, the polarity reversal of lamp current is synchronized with spoke time of a color wheel (switching timing between color areas) thereby operating the lamp.

In an alternating current extra-high pressure mercury lamp, in which a projection is formed at the tip of an electrode, and mercury whose amount is 0.20 mg/mm$^3$ or more is enclosed, the present inventor has tried to combine a lighting method for maintaining the appropriate shape of the projection which is disclosed in Japanese Utility Model Publication No. 2006-332015, with a lighting method in which "the polarity reversal of lamp current is synchronized with spoke time of a color wheel, thereby operating the lamp."

However, the undesired phenomenon arises in which lamp voltage goes up in a very early stage, such as in 20 hours or less after the lamp is turned on. As the result, an illuminance decreases on a screen face.

In view of the above problem, in the present drive method of a light source apparatus used for a projector using a color wheel, change of lamp voltage is controlled thereby suppressing illuminance change on a screen in an early stage of the life span of the lamp.

One of aspects of the present method is a method of driving a light source apparatus for a projector comprising a color wheel which is divided into at least RGB areas, a rod integrator lens which light passing through a predetermined light condensing area of the color wheel enters, and an image display device which receives light from the rod integrator lens, wherein the light source apparatus comprises an extra-high pressure mercury lamp having an act tube in which 0.20 mg/mm$^3$ of mercury and halogen is enclosed, and an electric supply control unit having a pair of electrodes, at a tip of which a projection is formed. The driving method comprises a step of supplying lamp current at a frequency selected from a range of 60 to 1,000 Hz as a stationary frequency, to the extra-high pressure mercury lamp, reversing a polarity of the current to be supplied to the extra-high pressure mercury lamp, when one of boundaries between color areas of the color wheel is located at the light condensing area, and supplying a low frequency current of 5 to 200 Hz, to the extra-high pressure mercury lamp at predetermined intervals, wherein the low frequency current starts to be supplied when a boundary from which a color area is changed to a predetermined color area is located at the light condensing area, wherein the low frequency current continues to be supplied for a duration corresponding to the integer number of color areas of the color wheel.

Another aspect of the present invention is a driving apparatus for a light source apparatus for a projector using a single plate having a color wheel, comprises means for supplying lamp current at a predetermined frequency to an extra-high pressure mercury lamp in which an electrode has a projection at the tip thereof and mercury whose amount is 0.20 mg/mm$^3$ or more is enclosed in the lamp, means for reversing a polarity of the lamp current to be supplied to the extra-high pressure mercury lamp, when one of boundaries between color areas of the color wheel is located at a light condensing area, and means for supplying a low frequency current to the extra-high pressure mercury lamp at predetermined intervals, wherein the low frequency current starts to be supplied when a boundary from which a color area is changed to a predetermined color area is located at the light condensing area, and wherein the low frequency current continues to be supplied for a duration corresponding to the integer number of color areas of the color wheel.

The technology of an extra-high pressure mercury lamp, in which an electrode has a projection at the tip thereof and mercury whose amount is 0.20 mg/mm$^3$ or more is enclosed in the lamp, and further low frequency lamp current is inserted, has never applied to a light source apparatus for a single plate type projector, before the present invention was made, although the technology has been applied to only a three plate type projector in which a three plate filter made by attaching RGB color plates to each other one by one, is used. In the three plate type projector, low frequency lamp current for only predetermined duration is applied thereto for predetermined insertion time at predetermined time intervals.

On the other hand, in a light source apparatus of such a single plate type projector in which an alternating current lamp is used, in order to avoid an image noise, only positive/negative current change was performed, synchronizing with spoke time. The present inventor tried a method in which when low frequency current was applied (inserted in) to the light source apparatus for a single plate type projector using an alternating current lamp in which an electrode has a projection, the number of times each color area of a rotating color wheel which passes a light condensing point the same during a duration of the low frequency current, while the positive/negative current is changed synchronizing with the spoke time as in the prior art, The low frequency current is applied (inserted) so as to maintain the shape of the projection during the life span of the lamp. As the method, which is easy and simple way in view of programming of a lighting power supply, the number of times each color area of the color wheel passes the optical focal point is made the same as one another. The procedure thereof will be described referring to FIGS. 2 and 9. FIG. 2 is a block diagram showing the internal structure of a single plate type projector, and FIG. 9 is a flow chart of an operation of a conventional light source apparatus. (1) An electric supply control unit 11 of a light source apparatus 10 detects a synchronizing signal from a control processing section 16 of a projector apparatus 100. (2) A counter built in the electric supply control unit 11 starts counting at a time point of every leading edge time of the synchronizing signal. (3) The polarity of lamp current is reversed at the time point of every leading edge of the synchronizing signal. (4) Lighting is carried out at a high frequency for a predetermined color area. (5) Lighting is carried out at a low frequency for a color area. (6) The counter is reset. The steps (2) to (6) are repeated after that.

Since in a single plate type projector apparatus, a formation angle of each color area of a color wheel is designed according to the brightness and color of the projector, the designs of projectors differ from one another, depending on models of respective projector makers.

When focusing on a point through which light emitted from the light source passes on a face of the rotating color wheel, since the color wheel is rotated at a fixed speed, for example, at 120 Hz (120 revolutions per second), transit time of each color area on the point differs, depending on the predetermined formation angle of each color area.

Even if only the number of the color areas through which light passes is determined, when (the ratio) of the color areas to be inserted are not determined, there is fluctuation in frequency of the low frequency current. For example, the color wheel is designed so that a red area, a yellow area, a green area, a cyanogen area, a white area and a blue area are arranged whose formation angles are 90, 35, 90, 35, 30, and 80 degrees, respectively. When the number of the color areas with respect to which the low frequency current is applied (inserted) is five (5), although the frequency turns into a frequency corresponding to 280 degrees from the red area to the white area when the low frequency current is applied (inserted) from timing of the red area. When the low frequency current starts being applied (inserted) from timing of the green area, the frequency turns into a frequency corresponding to 325 degrees from the green area to the red area. Thus, the frequency changes. The present inventor considered that a voltage rise was observed in the early stages of lamp lighting as a result of non-constant frequency of the low frequency current.

The voltage rise means an increase of the distance between electrodes (arc length) in structure of the lamp. The increase of the arc length means that the use efficiency in an optical system decreases, so that early illuminance attenuation is caused. From an observation of X-ray photograph of the lamp, it turned out that deformation of the electrode caused the increase of the arc length.

If the color areas of the color wheel are not determined when the low frequency current is applied (inserted), it is not known why such electrode deformation takes place. However, it is believed that the deformation occur as described below.

As disclosed in Japanese Utility Model Publication No. 2006-332015, when the low frequency current is applied (inserted), there is an effect of melting deposit material which is formed from tungsten, which is electrode material, and which is evaporated from the electrode tip near a tip projection. It is considered that a slight difference of duration of low frequency current insertion (application) clearly appears as a difference in a fusion or an increase of deposit material formed near the tip projection. There is the optimal range in the energy for the fusion, so that the separated tungsten can be melted, and if the low frequency current insertion duration is long and the energy is too large, the main projection is worn out. On the contrary, when the low frequency current insertion duration is short so that the energy for fusion is inadequate, there is only a small effect of suppressing the deposit. That is, the duration always has to be constant. When, in the prior art, the low frequency current insertion is performed at the spoke time, that is, at time when the light condensing area of radiation light comes to a starting position of a color area on a face of the rotating color wheel. However, since a color area for which the low frequency current insertion starts is not specified, it is considered that the low frequency current insertion duration varies since the formation angles of color areas of the color wheel are different from one another. In view of the above considerations, the present invention was made.

According to the present invention, since in a light source apparatus used for a projector apparatus using a color wheel, a color area for which the low frequency current insertion starts is fixed, it is possible to suppress change of lamp voltage, so that degradation of the light source apparatus can be suppressed at beginning of the life span of the lamp.

BRIEF DESCRIPTION OF DRAWINGS

Other features and advantages of the present driving method of light source apparatus for a projector will be apparent from the ensuing description, taken in conjunction with the accompanying drawings, in which.

DETAILED DESCRIPTION

A description will now be given, referring to embodiments of the present the present driving method of light source apparatus for a projector. While the claims are not limited to such embodiments, an appreciation of various aspects of the present flash lamp emitting device is best gained through a discussion of various examples thereof.

Figure 2:
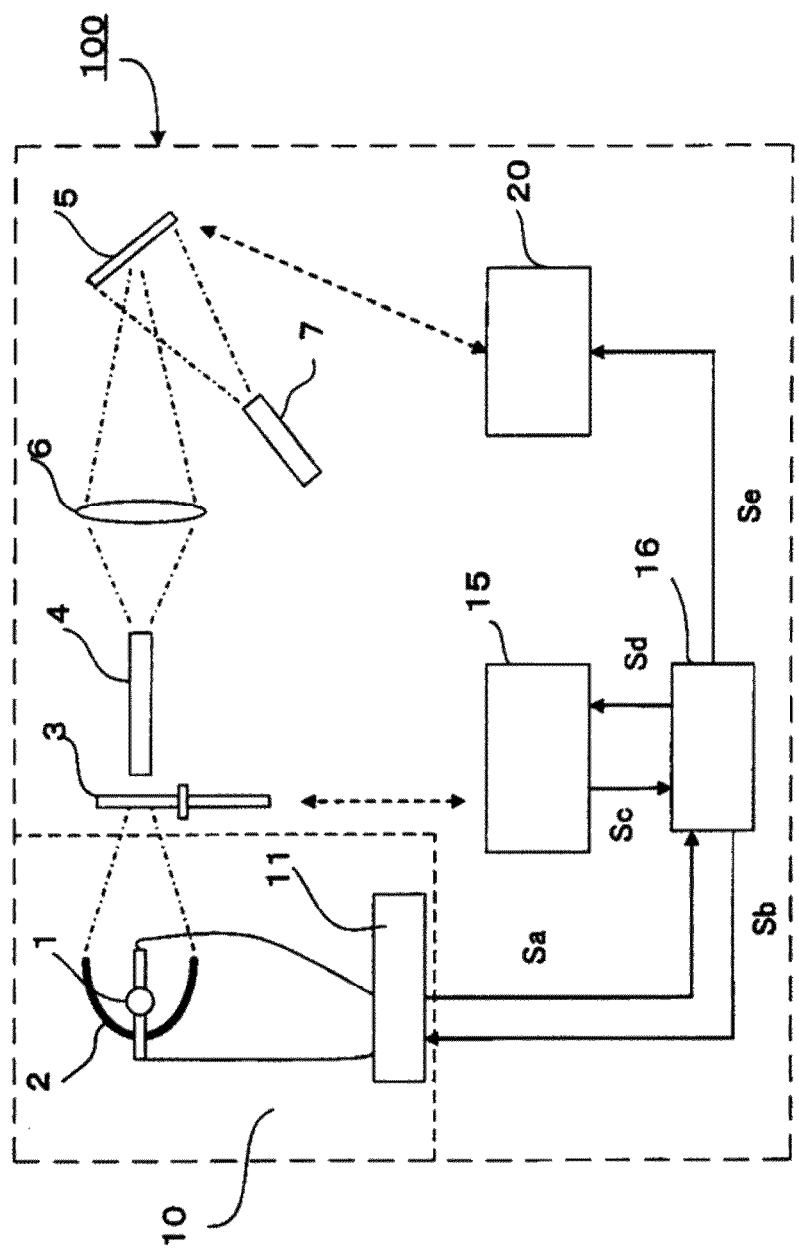
FIG. 2 is a block diagram showing the internal structure of a single plate type projector to which a drive method according to the present invention is applied.

FIG. 2 is a block diagram showing the internal structure of a single plate type projector. The projector 100 comprises an alternating current lighting type extra-high pressure mercury lamp 1 having a concave reflection mirror 2, a color wheel 3 which divides light from a lamp 1 into colors in a time divided manner, a rod integrator lens 4 which light passing through a predetermined light condensing area of the color wheel 3 enters, an optical element 6 which makes the light passing through the rod integrator lens reach an image display device 5, such as a DMD (Digital Micromirror Device), and an optical system 7 which projects an image on a screen of the image display device 5.

The extra-high pressure mercury lamp 1 and the concave reflection mirror 2 are arranged so that an arc luminescent spot of the extra-high pressure mercury lamp 1 and the primary focal point of the concave reflection mirror 2 may be approximately in agreement with each other. The secondary focal point of the concave reflection mirror 2 is located approximately at an incidence edge of the rod integrator lens 4, so that the light reflected from the concave reflection mirror 2 enters on the rod integrator lens 4 through the color wheel 3. Drive control of the color wheel 3 is performed so as to be rotated, or stopped, etc. by a color wheel drive section 15, and, electric supply control of the extra-high pressure mercury lamp 1 is performed by an electric supply control unit 11.

Moreover, the projector 100 is equipped with a processor for carrying out computation, a ROM for memorizing information, such as a program required for the computation, and a control processing section 16 which has a RAM for memorizing information generated temporarily. The control processing section 16 executes processing which controls an operation of the whole projector.

Moreover, the projector 100 is equipped with the color wheel drive section 15 which has a motor for rotating the color wheel 3, and a control circuit which controls the rotational speed of the color wheel. The color wheel drive section 15 is connected to the control processing section 11.

The electric supply control unit 11 which supplies an alternating current to the lamp, is connected to the alternating current type extra-high pressure mercury lamp 1, thereby forming a light source apparatus 10. The electric supply control unit 11 is connected to the control processing section 16 with signal lines. A device control circuit 20 which executes processing in which an image required for the image display device 5 is generated, is connected to the image display device 5, and the device control circuit 20 is connected to the control processing section 11.

Figure 3B:
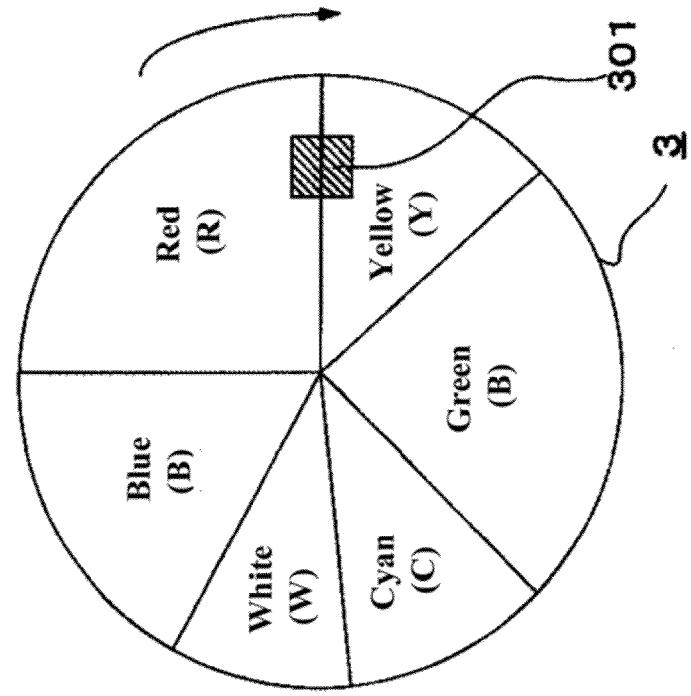
FIG. 3 is an enlarged view of a color wheel.
Figure 3A:
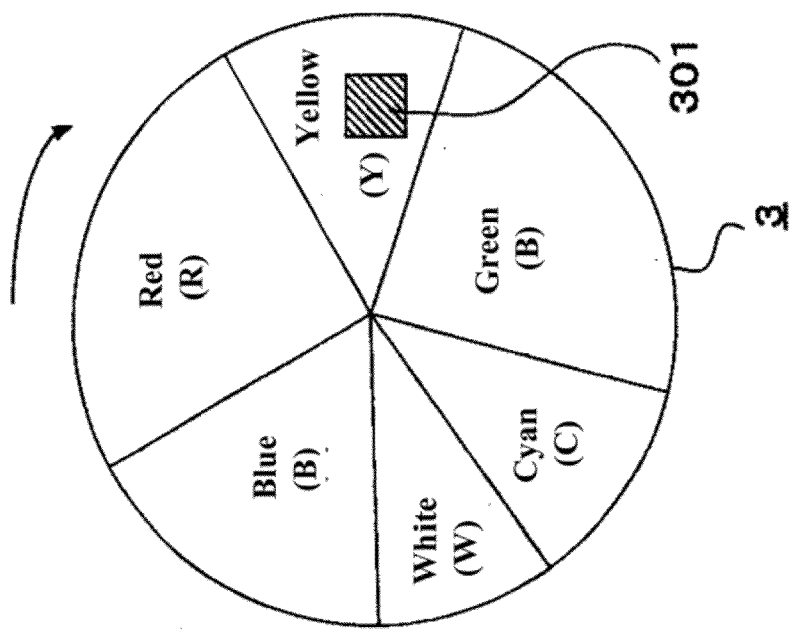

FIGS. 3A and 3B respectively show an enlarged view of the color wheel 3. The color wheel is also called a rotation filter and made of a disk-like glass. In the filter, a red area (R), a green area (G), a blue area (B), a white area (W), a cyanogen area (C), and a yellow area (Y) which are respectively in a fan shape, are formed. A square area shown in diagonal lines shows the light condensing area 301.

FIG. 3A shows a state where yellow light enters the rod integrator lens. FIG. 3B shows a state where red and yellow mixed light enters the rod integrator lens, since the boundary of the red and yellow areas are above the rod integrator lens.

The light reflected from the concave reflection mirror 2 of the light source apparatus 10 passes through the light condensing area 301 hypothetically formed on the color wheel 3. When the color wheel 3 is rotated, light of a color located at the light condensing area 301 is guided to the rod integrator lens 4 in the downstream side of the color wheel 3, one by one. Therefore, since light of red (R), green (G), blue (B) white (W), cyanogen (C), and yellow (Y) is projected in time divided manner, only one of the colors is projected instantaneously through the image display element 5, so that human eyes visually recognize these colors or mixed colors as an image. Since white (W) light makes an image bright entirely, the image can be made brighter entirely by projecting the white light at predetermined time intervals. Here, since the color wheel 3 is rotated at, for example, 120 Hz (120 revolutions per second), each of red, green, blue, white, cyanogen, and yellow light is projected 120 times per second. For example, formation angles of the red, green, blue, white, cyanogen and yellow areas, are 90, 90, 80, 30, 35, and 35 degrees, respectively. In addition, in consideration of the color balance and the brightness of the image, the areas of these colors of the color wheel 3 are specified respectively. The rectangle shape light condensing area 301 which is virtually formed on the color wheel is 3.6×4.8 mm.

Figure 4:
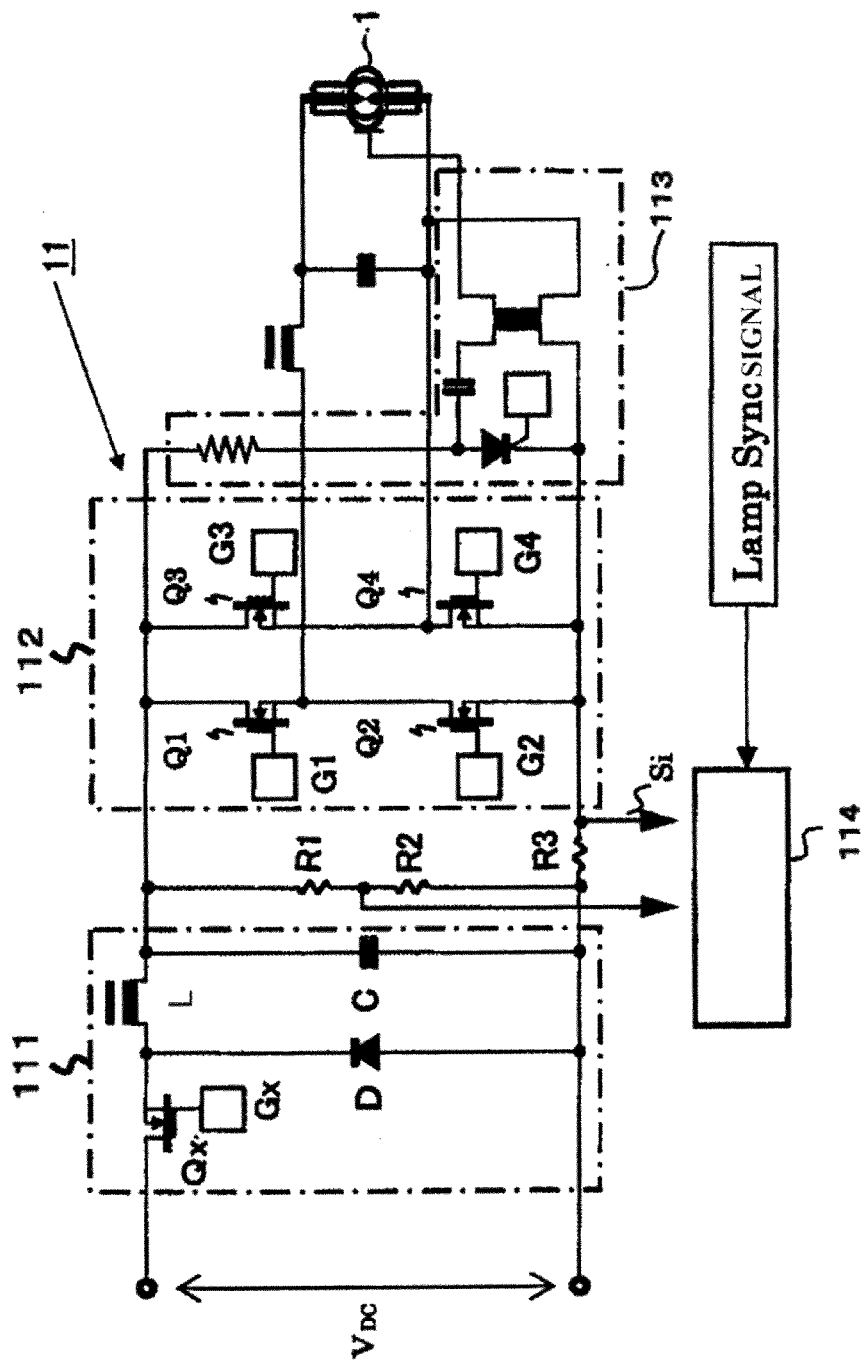
FIG. 4 is a schematic view of the structure of an electric supply control unit.

FIG. 4 is a block diagram showing the internal structure of the electric supply control unit 11. A starter circuit 113 is a high voltage generating circuit in which voltage from about several volts to about a dozen volts, which is required for a dielectric breakdown of the lamp in an early stage of lamp starting, is generated. The starter circuit 113 is made up of an igniter coil, a thyristor, etc. The electric supply control unit 11 has a stepdown chopper circuit 111 which converts direct current from a direct-current power source to direct current so as to be appropriate lamp electric power and outputs it to a full bridge circuit, and the full bridge circuit 112 which converts the direct current that the stepdown chopper circuit outputs, into an alternating current, and outputs it to the extra-high pressure mercury lamp 1.

The stepdown chopper circuit 111 comprises a switching element Qx, a diode D, a coil L, and a capacitor C. Resistors R1 and R2 for voltage detection and a resistor R for current detection are connected to a downstream side part of the diode D and the coil L, and a current detection signal Si is transmitted to a control circuit 114. A PWM control circuit Gx is connected to the switching element Qx, and the control circuit section calculates the current detection signal Si and a voltage detection signal and transmits a signal to the PWM control circuit Gx so that the power may become a target electric power, wherein the electric power of the direct current which the stepdown chopper circuit 111 outputs is controlled by performing PWM control of the duty ratio of the switching element, based on the signal.

Bridge control circuits G1, G2, G3, and G4 are connected to switching elements Q1, Q2, Q3, and Q4 of the bridge circuit 112, respectively. The bridge control circuit 112 controls switching of ON/OFF states of these switching elements Q1, Q2, Q3, and Q4 by inputting gate signals into the respective switching elements Q1, Q2, Q3, and Q4, so that the switching elements Q1 and Q4 which form a pair, and the switching elements Q2 and Q3 form a pair, are turned on and off by turns. Thereby, the direct current is converted into alternating current so as to be supplied to the alternating current type extra-high pressure mercury lamp 1. These switching operations are controlled by synchronization with a Lamp Sync signal.

Figure 5:
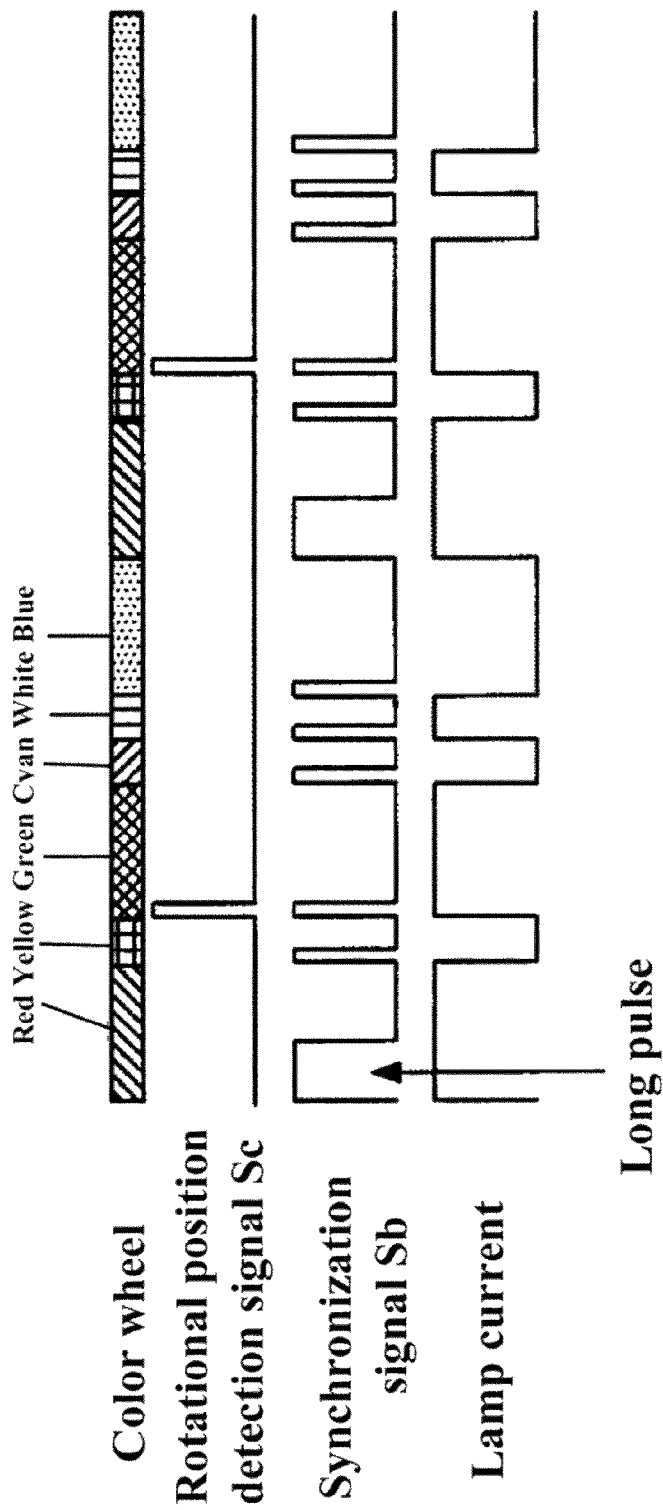
FIG. 5 is a control timing chart showing signals which are outputted and inputted between the respective structural blocks, when a projector 100 is operated.

Next, an operation of the projector 100 and the electric supply control unit 11 will be described below, referring to FIG. 2 and FIG. 5. FIG. 2 is a block diagram showing the internal structure of a single plate type projector. FIG. 5 is a control timing chart showing signals which are outputted and inputted between the respective structural blocks, when the projector 100 is operated. In order to detect the positions of the color areas of the color wheel 3, a mark is put on a rotation section of the color wheel 3. A rotation position detection signal Sc of the color wheel is acquired by reading the mark by a sensor. Thereby, during an operation, the projector 100 detects which color area, the present light passes through so as to be projected on the screen. Moreover, the control processing section 16 (microprocessor) provided inside the projector 100, transmits a synchronizing signal Sb, which is a signal for controlling the electric supply control unit 11, based on the rotation position detection signal of the color wheel. There are two roles in the synchronizing signal Sb. One of them is to pass information of polarity-reversal timing of lamp current to the electric supply control unit 11, and the other role is to transmit information about color areas for which the polarity reversal should be performed, to the electric supply control unit 11. In FIG. 5, the polarity-reversals of the lamp current are performed in synchronization with a leading edge of the synchronizing signal. On the other hand, recognition of a specific color area is performed by giving a long pulse signal having a long duration, corresponding to the specific color area. In the example shown in these figures, the long pulse signal is transmitted in a period corresponding to the red area.

Figure 1:
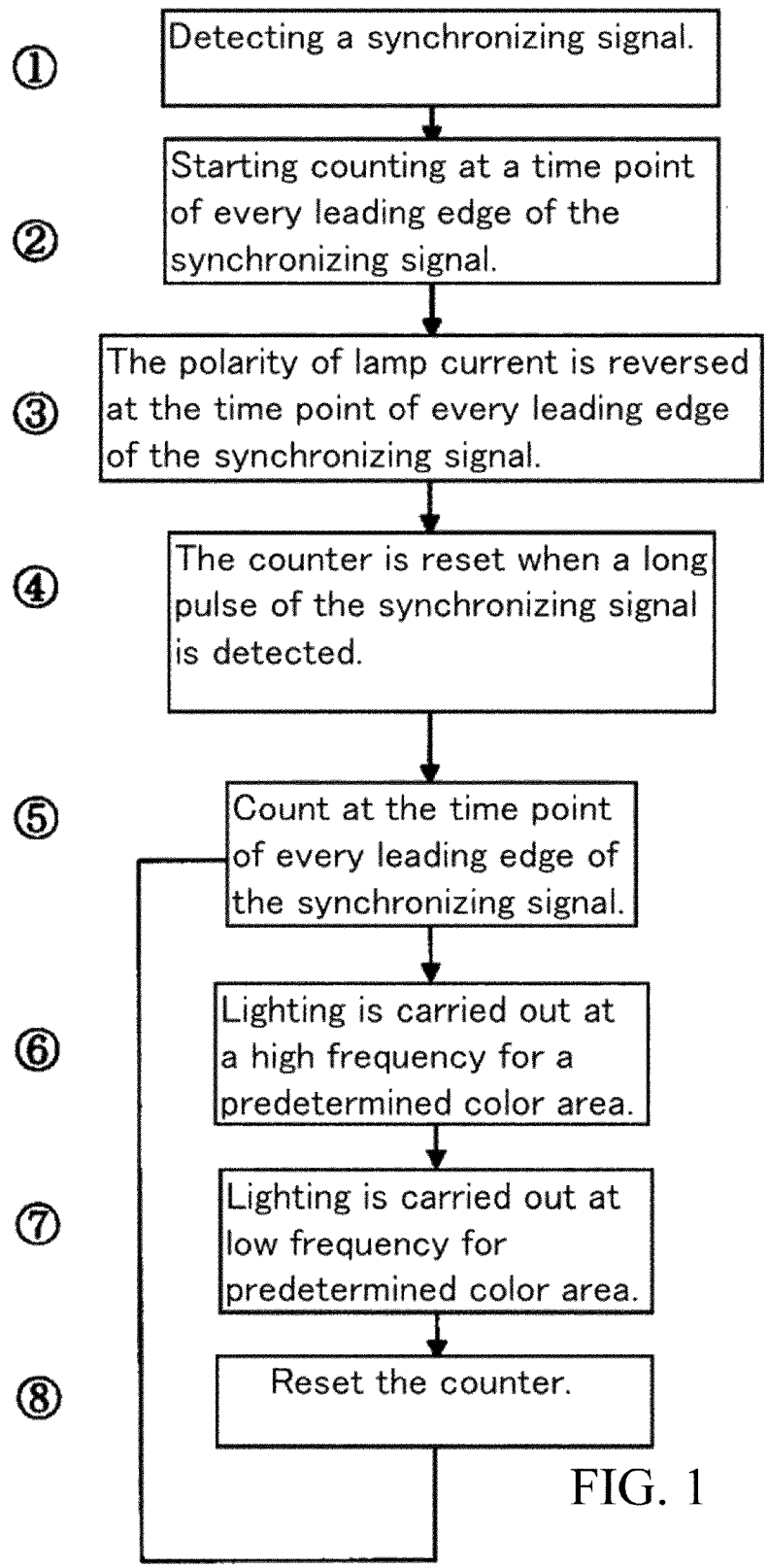
FIG. 1 is a flow chart showing an operation of a light source apparatus according to the present invention.

FIG. 1 shows a flow chart of an operation of the light source apparatus according to the present invention. (1) The electric supply control unit 11 of the light source apparatus 10 detects the synchronizing signal from the control processing section 16 of the projector apparatus 100. (2) The counter built in the electric supply control unit 11 starts counting at a time point of every leading edge of the synchronizing signal. (3) The polarity of lamp current is reversed at the time point of every leading edge of the synchronizing signal. (4) When a long pulse corresponding to the specific color area in the synchronizing signal from the control processing section 16 is detected, reset a counter. (5) The counter built in the electric supply control unit 11 starts counting at the time point of every leading edge of the synchronizing signal. (6) A high frequency lighting is performed for a predetermined color area. (7) A low frequency lighting is performed for a predetermined color area. (8) Reset the counter. The lamp is maintained at a steady lighting state by repeating the steps (1) to (8) after that.

The control processing section 16 shown in FIG. 2 receives image data from an image output device, such as a DVD player and a personal computer. The rotation control signal Sd which corresponds to vertical synchronizing signal of an image signal is outputted to the color wheel drive section 15. The color wheel drive section 15 rotates the color wheel 3 at fixed speed according to the rotation control signal Sd from the control processing section 16. The color wheel drive section 15 is equipped with a section for detecting the rotation position about which color area in the color wheel 3 the present light passes through, and outputs the rotation position detection signal Sc which shows the detected rotation position to the control processing section 16. Thereby, the control processing section 16 recognizes which color area, light passes through at any time. The control processing section 16 controls an operation of the device control circuit 20 according to the rotation position of the color wheel 3, and displays an image for each color based on image data by the image display device. According to the rotation position of the color wheel 3, the control processing section 16 generates the synchronizing signal Sb for synchronizing timing for reversing the polarity of alternating current supplied to the alternating current extra-high pressure mercury lamp 1, with timing (spoke time) at which the light from the extra-high pressure mercury lamp 1 passes through the boundary of color areas in the color wheel 3, so that the generated synchronizing signal Sb is outputted to the lamp power supply. The electric supply control unit 11 carries out the polarity reversals of the lamp current through the bridge control circuit according to the timing of the synchronizing signal Sb.

Embodiment

Figure 6:
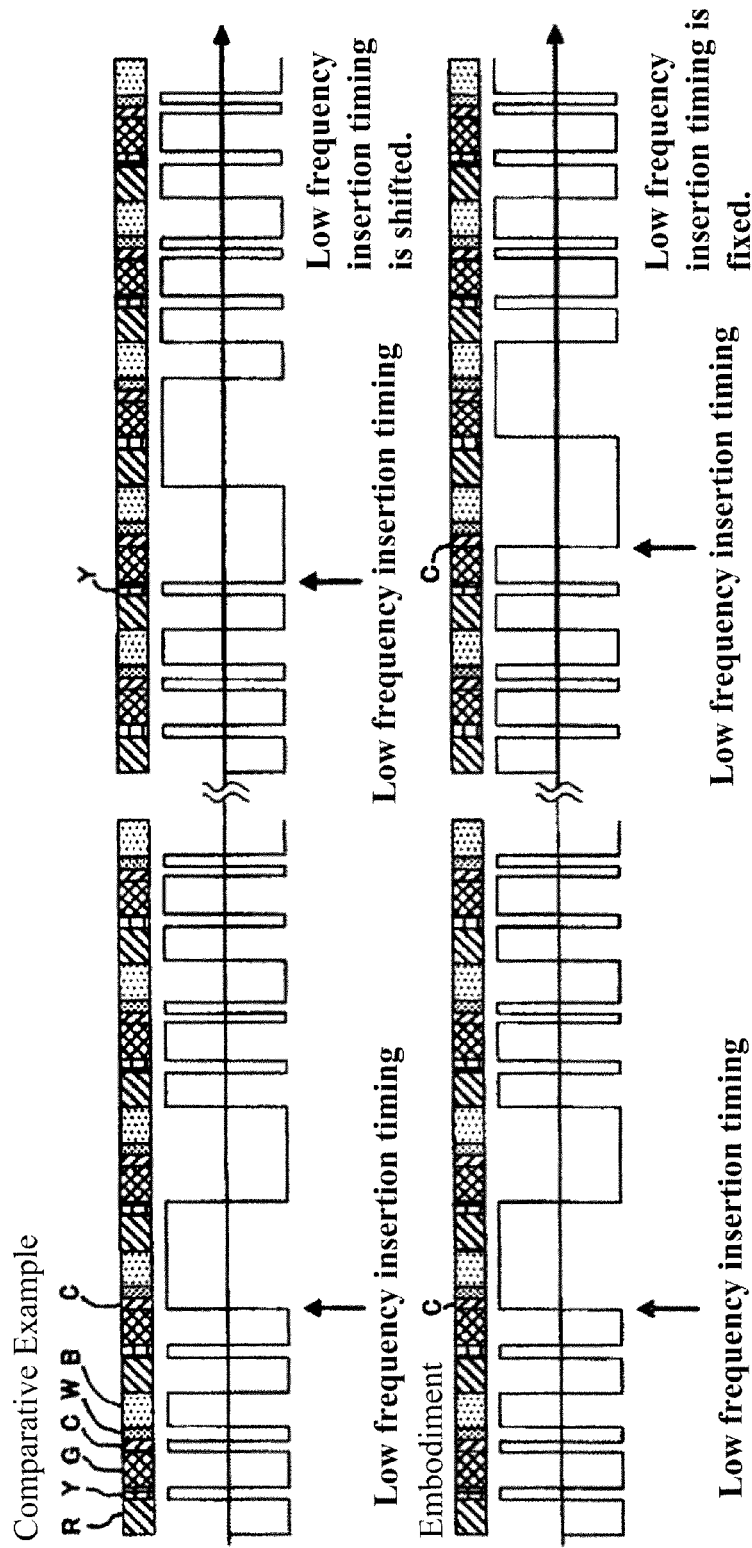
FIG. 6 is a timing chart showing low frequency current insertion timing in a relation with color areas of a color wheel according to the present embodiment and a comparative examples.

An experiment will be described below in order to show the effects of the present invention, referring to FIG. 6 and FIG. 7. Alternate-current lighting type extra-high pressure mercury lamps 30 were used in this experiment as shown in FIG. 8. In the arc tube 31 made of quartz glass, 0.25 mg/mm$^3$ of the mercury and rare gas, and a very small amount of halogen gas is enclosed. The arc tube outer diameter of the lamp is 12 mm, a distance between electrodes 40 and 40 is 1.1 mm, and rated power thereof is 250 W. At the tips of the respective electrodes 40 and 40, projections 41 and 41 are formed.

The lamp voltage in an early stage of lighting was about 80 V. Sealing portions 32 were formed in both ends of a light emission section. Conductive metallic foils 33 made of molybdenum were airtightly buried in the respective sealing portion 32 by shrink sealing. An axis portion of each electrode 40 was joined to one end of the metallic foil 33, The external lead 34 was joined to the other end thereof, so as to be electrically connected with an electric supply control unit (not shown). Four lamps according to this specification were prepared, and the lighting examination of every two was carried out on condition set forth below.

Conditions 1

Comparative Example

An average frequency of stationary current was set to 360 Hz, and a low frequency current whose frequency was 74-96 Hz was inserted. First, the low frequency current was inserted at a start time of the cyanogen (C) area of the color wheel, and the low frequency current was continuously inserted for a duration corresponding to nine color areas in the color wheel. However, after that, the low frequency current was not inserted at a start time of the cyanogen (C) area of the color wheel, but duration of the insertion of the low frequency current was set to a duration corresponding to nine color areas in the color wheel. The interval of the low frequency insertions was set to a duration corresponding to 38 color areas.

Conditions 2

Embodiment

A frequency of stationary current was set to 360 Hz, and a period of applying a low frequency current whose frequency was 84 Hz was inserted in a duration during which current is applied to the lamp. First, not only the low frequency current was inserted at a start time of the cyanogen (C) area of the color wheel, but also, after that, the low frequency current was inserted at a start time of the cyanogen (C) area of the color wheel. The duration of the insertion of the low frequency current was set to a duration corresponding to nine color areas in the color wheel. That is, the low frequency current was continuously applied for a duration corresponding to nine color areas in the color wheel. The interval of the low frequency insertions was set to a duration corresponding to 39 color areas. The result of experiment which was conducted about two lamps on conditions 1 is shown in FIG. 7, as comparative examples 1 and 2. The result of experiment which was conducted about two lamps on the conditions 2 is shown in FIG. 7 as embodiments 1 and 2.

Figure 7:
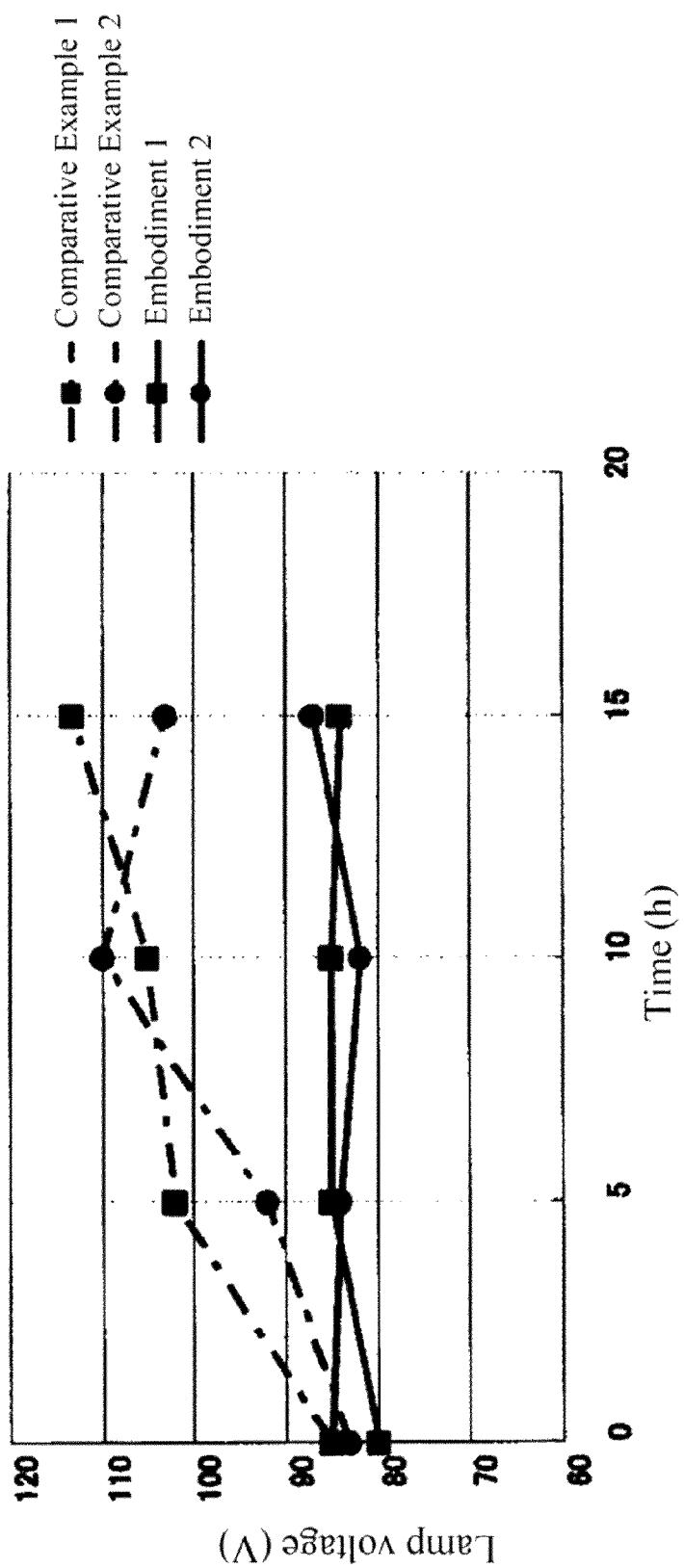
FIG. 7 is a diagram showing effects of the present invention.
Figure 8:
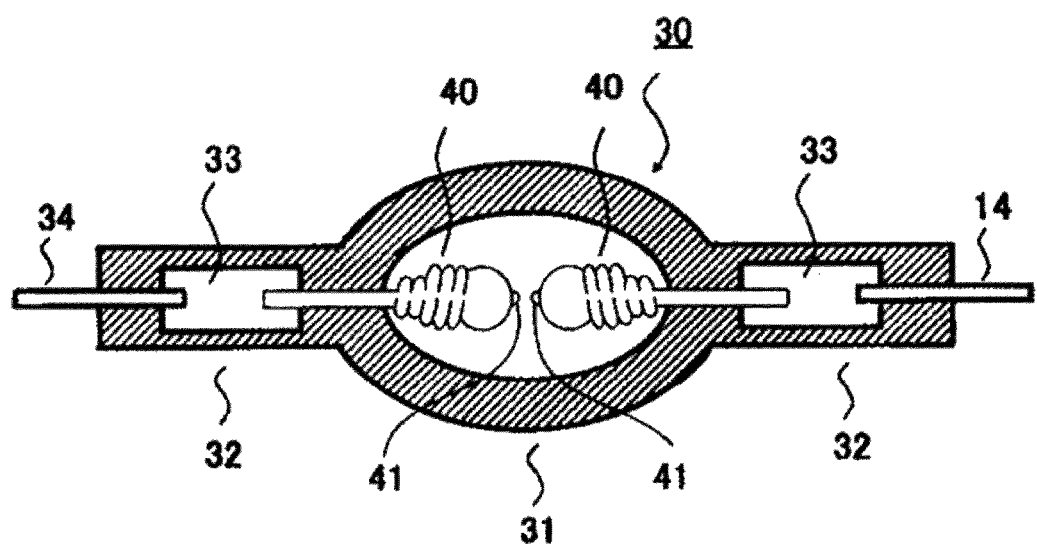
FIG. 8 a schematic diagram showing the structure of a discharge lamp.
Figure 9:
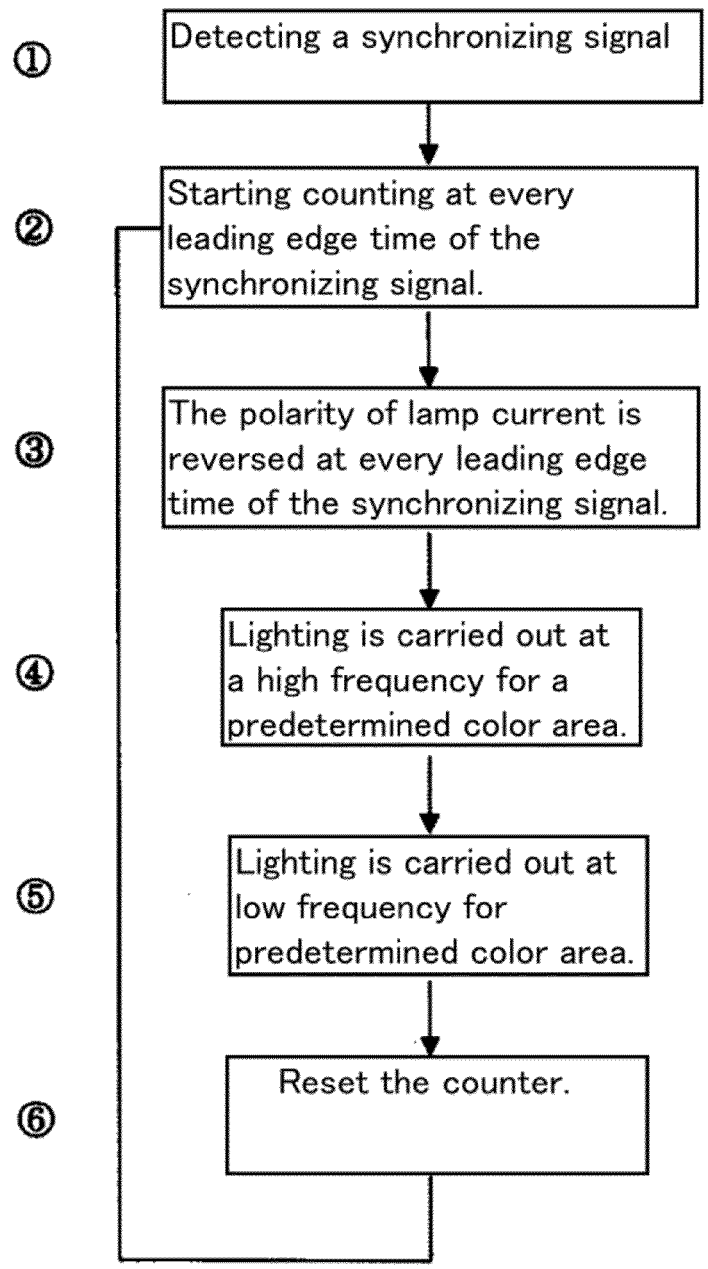
FIG. 9 is a flow chart of an operation of a light source apparatus according to the prior art.

In the result of the comparative examples shown in FIG. 7, the lamp voltage rose by 20-30 (V) in 15 hours after lighting was started. However, in the light source apparatus of the embodiment 1 and 2 according to the present invention, the lamp voltage did not almost change, and was stable from the lighting start. That is, when the present light source apparatus was used, it was confirmed that initial degradation of illuminance on the screen of the projector did not occur.

The preceding description has been presented only to illustrate and describe exemplary embodiments of the present driving method of light source apparatus for a projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A driving apparatus comprising:
   a lamp configured to focus light onto a light condensing area of a color wheel, each color area of the color wheel being rotatable through said light condensing area;
   an electric supply control unit configured to output current to said lamp, low frequency insertion timing being an adjustment of the current from a stationary frequency range to a low frequency range;
   a control processing section configured to detect an intersection between said light condensing area and a boundary, said boundary being a transition on the color wheel from a particular color area of the color wheel to another particular color area of the color wheel,
   wherein only a detection of the intersection permits said low frequency insertion timing, said low frequency insertion timing being prevented when said light condensing area intersects any other color area of the color wheel.

2. The driving apparatus according to claim 1, wherein said lamp is an extra-high pressure mercury lamp.

3. The driving apparatus according to claim 1, wherein said current remains at said low frequency range until after a number of color areas on the color wheel has passed through said light condensing area.

4. The driving apparatus according to claim 1, wherein said light is transmissible through said color wheel.

5. The driving apparatus according to claim 1, wherein said stationary frequency range differs from said low frequency range.

6. The driving apparatus according to claim 1, wherein said stationary frequency range is 60 to 1,000 Hz.

7. The driving apparatus according to claim 1, wherein said low frequency range is 5 to 200 Hz.

8. The driving apparatus according to claim 1, wherein stationary frequency insertion timing is an adjustment of the current from said low frequency range to said stationary frequency range.

9. The driving apparatus according to claim 1, further comprising:
   a control processing section configured to generate a synchronizing signal, a transition of the synchronizing signal indicating a rotation of a color area on the color wheel to said light condensing area.

10. The driving apparatus according to claim 9, wherein a polarity of the current is reversible upon said transition of the synchronizing signal.

11. The driving apparatus according to claim 9, further comprising:
    a color wheel drive section configured to detect a rotational position of the color wheel, said synchronizing signal being synchronous with said rotational position.

12. A driving method comprising:
    focusing light onto a light condensing area of a color wheel, each color area of the color wheel being rotatable through said light condensing area;
    outputting current to a lamp, low frequency insertion timing being an adjustment of the current from a stationary frequency range to a low frequency range;
    detecting an intersection between said light condensing area and a boundary, said boundary being a transition on the color wheel from a particular color area of the color wheel to another particular color area of the color wheel,
    wherein only a detection of the intersection permits said low frequency insertion timing, said low frequency insertion timing being prevented when said light condensing area intersects any other color area of the color wheel.

13. The driving method according to claim 12, further comprising:
    transmitting said light through said color wheel.

14. The driving method according to claim 12, wherein said stationary frequency range differs from said low frequency range.

15. The driving method according to claim 12, wherein said stationary frequency range is 60 to 1,000 Hz.

16. The driving method according to claim 12, wherein said low frequency range is 5 to 200 Hz.

17. The driving method according to claim 12, further comprising:

fixing said current at said low frequency range until after a number of color areas on the color wheel has passed through said light condensing area.

18. The driving method according to claim 12, further comprising:
adjusting the current from said low frequency range to said stationary frequency range.

19. The driving method according to claim 12, further comprising:
generating a synchronizing signal, a transition of the synchronizing signal indicating a rotation of a color area on the color wheel to said light condensing area.

20. The driving method according to claim 19, wherein a polarity of the current is reversible upon said transition of the synchronizing signal.

21. The driving method according to claim 19, further comprising:
detecting a rotational position of the color wheel, said synchronizing signal being synchronous with said rotational position.

* * * * *